Feb. 14, 1933.　　　　　J. S. SMYSER　　　　　1,897,990
ELECTRICAL APPARATUS
Original Filed July 25, 1928　　2 Sheets-Sheet 1

INVENTOR
JAMES S. SMYSER
by ATT'YS

Feb. 14, 1933.  J. S. SMYSER  1,897,990
ELECTRICAL APPARATUS
Original Filed July 25, 1928   2 Sheets-Sheet 2
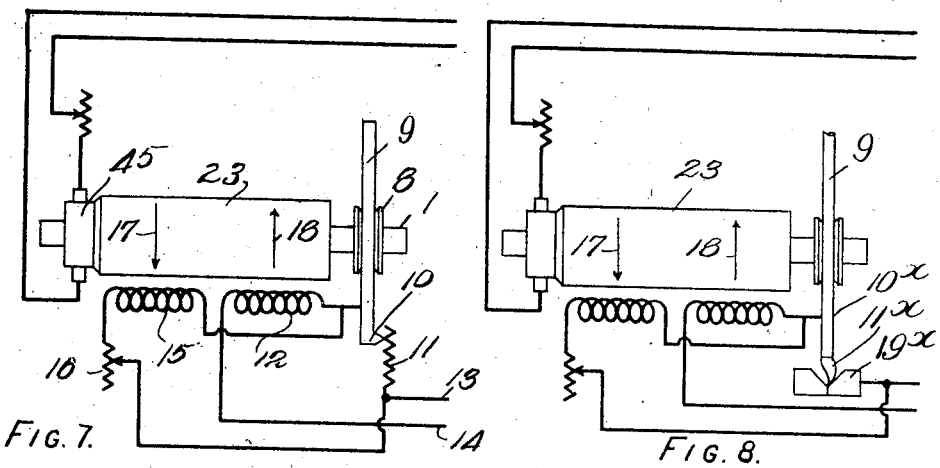
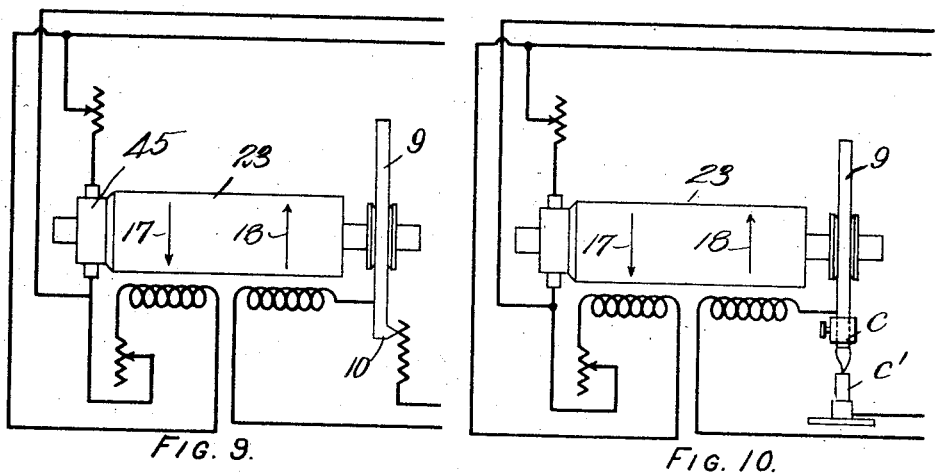
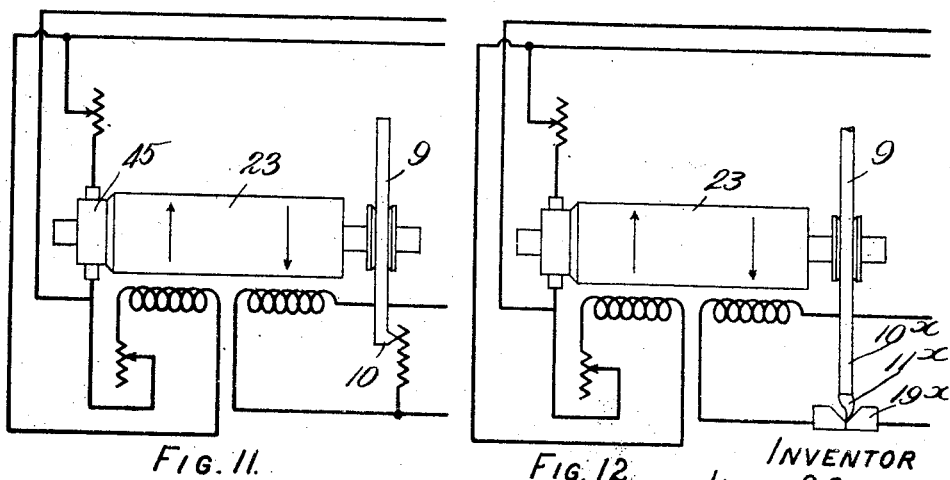
INVENTOR
JAMES S. SMYSER
by Roberts Cushman Woodbury
ATT'YS Patented Feb. 14, 1933

1,897,990

UNITED STATES PATENT OFFICE

JAMES S. SMYSER, OF BOSTON, MASSACHUSETTS

ELECTRICAL APPARATUS

Application filed July 25, 1928, Serial No. 295,188. Renewed September 29, 1932.

This invention pertains to electrical apparatus and relates more particularly to a method of and means for regulating, controlling, or indicating the operation of electrically energized apparatus or electrical apparatus of any type employing electricity in any of its various manifestations, including electromagnetism, radiant energy, heat, etc. I have previously devised and built certain desirable and useful apparatus of this type, wherein two electric motors are differentially associated with a movable element in such a manner that the rate and direction of movement of the movable element are directly related to the difference in speed of the two motors,—the motor which runs the fastest at any given instant determining the direction of movement of said element. This movable element is arranged to vary the resistance in a "controlled" electrical circuit in accordance with its position, and the relative speed of the two motors is varied in response to variations in resistance of such controlled circuit, as, for example, by providing (in series or in parallel with said controlled circuit) auxiliary windings in the motor fields.

In the prior apparatus the differential motive force of the motors is transmitted to the controlled element through an epicyclic gear train of the type commonly known as "differential gearing," and for many purposes this arrangement is efficient and satisfactory. However, under certain conditions this prior apparatus is not as sensitively responsive or certain in its action as might be desired. The first and possibly the most potent cause of difficulty in the prior apparatus is the electrical effect known as "hysteresis". Due to this effect the flux furnished by the auxiliary field does not exactly follow the current when the latter is diminishing, so that the motor to be speeded up does not reach the speed necessary for proper regulation as quickly as is sometimes desired. A second source of trouble is that the motor with the weaker field is driven as a generator by the other motor, under certain conditions, through the differential gearing, thus making the operation somewhat uncertain. As the result of further experiment induced by observation of the behavior of my prior devices under conditions of commercial use, I have determined that the differential gearing may be discarded, and the differential association of the motors accomplished in another and novel manner. In accordance with this new arrangement, the apparatus is simplified and cheapened, the effect of hysteresis is reduced to a point where it may be considered negligible, all back-lash and lost motion such as may occur in a differential gearing is done away with, and thus the apparatus is sensitive and certain in operation and provides a maximum of accuracy.

In attaining the above results, I dispense entirely with the differential gearing, and in a preferred embodiment of the invention wherein the movable element is actuated by a rotary shaft, I mount two armatures upon the same shaft or, alternatively, embody both armatures in a single structure on said shaft. I then provide field windings adapted when energized to produce fields of magnetic force tending respectively to turn the armature in opposite directions, the armature remaining stationary when the two windings exert magnetic force of equal force, but turning in one direction or the other as determined by the predominant force when the magnetic effects of the two windings differ. As thus arranged, it is to be noted that the movement of the controlled element depends not upon the difference in speed of two shafts but upon a difference in opposing torques acting on the same shaft.

I contemplate a wide range of utility of the invention and that it may be employed wherever it is advantageous, either for direct or indirect effect, to cause the movement of a part in response to variations in current or potential in a circuit whose resistance or other characteristic varies in accordance with the position of such movable part. Among such possible applications I may mention as examples arc welding, arc lighting, the regulation or indication of electrical apparatus or effects, remote synchronized control, as for example in the operation of artillery, navigation, chronometry and signalling systems, but I regard all applications of this underlying principle as falling within the scope of the invention as defined in the appended claims.

In the accompanying drawings,

Fig. 7 is a view similar to Fig. 1, but having the two motors combined into a single structure provided with but a single armature, the resistance adjusting element being arranged at one end of the armature shaft;

Fig. 8 is a view generally similar to Fig. 2, but showing a device having a single armature like that of Fig. 7;

Fig. 9 is a view generally similar to Fig. 3, but showing a modified arrangement using a single armature;

Fig. 10 is a view generally similar to Fig. 4, but showing a single armature and illustrating the application of the device to arc lamp control; and Figs. 11 and 12 are views generally similar to Figs. 5 and 6 respectively, but showing the use of a single armature.

Figure 1:
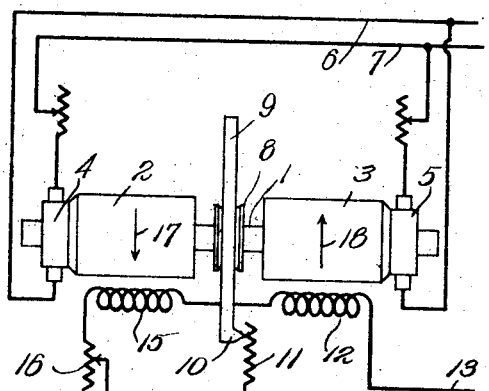
Fig. 1 is a diagrammatic view illustrating one embodiment of the invention wherein the field windings for one motor are in series with the controlled circuit and the field windings for the other motor are in parallel with the controlled circuit while the movable element constitutes the adjustable contact of a rheostat or variable resistance.

Referring to Fig. 1, I have diagrammatically illustrated two electric motors having a common shaft 1 which carries two armatures 2 and 3 respectively comprising windings which are connected through usual commutators 4 and 5 with mains 6 and 7 supplying current at substantially constant potential. The shaft 1 is provided with a drive member or other means, for example a friction pulley 8, for moving a rod 9 in one direction or the other in accordance with the direction of rotation of the shaft 1, it being understood that the parts 8 and 9 are intended merely as diagrammatic exemplifications of any suitable means or mechanism whereby rotation of the shaft in one or the other direction correspondingly actuates a reciprocating or oscillating element. However, for accurate results, it is essential that the connecting mechanism be of a character such as to transmit movement from the shaft to said element without slip and in accurately timed relation or "synchronously". As disclosed in Fig. 1, the rod 9 carries the movable contact 10 of a rheostat or other variable resistance device comprising the cooperating fixed resistance represented diagrammatically at 11. The parts 10 and 11, as shown in Fig. 1, are connected in series with the field windings 12 of the right-hand motor having the armature 3, and with mains 13 and 14 supplied with current from a suitable source, said mains 13 and 14, together with parts 10, 11 and 12, or their equivalents, being hereinafter referred to as the "controlled circuit". The field windings 15 of the left-hand motor having the armature 2 are connected in parallel with the controlled circuit, a variable resistance 16 preferably being arranged in series with the field 15 to permit initial adjustment of the relative effect of the two fields 15 and 12.

The windings of the armatures 2 and 3 and of the fields 15 and 12 are so designed that when the fields are energized under normal conditions, the resultant torque in each motor is indicated by the arrows 17 and 18, these torques being in opposite directions. By proper design of the armatures and field windings, combined if desired with adjustment of the resistance 16, the device is arranged so that so long as constant predetermined conditions are maintained in the controlled circuit, the oppositely acting torques will balance and the shaft 1, together with the part 10, will remain stationary. On the other hand, when such predetermined conditions are departed from, the opposing torques will be unbalanced and the part 10 will be moved in the appropriate direction to restore the predetermined conditions in the controlled circuit.

For example, if it be desired to maintain a constant difference of potential between two points in the controlled circuit as represented for instance by the member 10 and the cooperating or active part of the resistance 11, the parts are so designed and adjusted that at the desired potential the series current through field 12 and resistance 11 exerts a torque on armature 3 which is equal and opposite to the torque produced by the shunt current through field 15 acting on armature 2. If, now, the resistance between the parts 10 and 11 should increase above normal, the current through the field 12 and resistance 11 will drop relatively to that through the shunt field 15, resulting in a predominant torque in the direction of the arrow 17. The rod 9 is thus moved down, carrying the contact 10 downwardly from its normal position, thus cutting out resistance in the controlled circuit until the resulting increased flux produces a heavier torque in the direction of the arrow 18 sufficient to restore the normal condition of balance. Thus the device operates as an automatic regulator of the potential at the selected point in the controlled circuit, and as the movement of the shaft is never great,—as the current flow through the armatures is substantially constant,—and as the two armatures are rigidly connected to one another, substantially all of the difficulties experienced with prior apparatus of this type are avoided.

Figure 2:
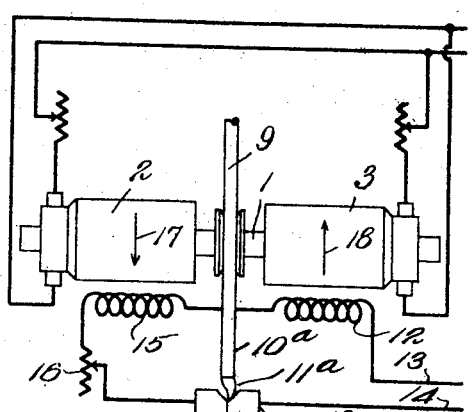
Fig. 2 is a view similar to Fig. 1 but showing the movable element as constituting an arc electrode.

In Fig. 2 I have illustrated the mechanism of Fig. 1 as applied to the control of an arc current, the movable electrode 10$^a$ taking the place of the contact 10 of Fig. 1, while the arc 11$^a$ performs the function of the variable resistance 11 of Fig. 1. In Fig. 2 the parts, except those just mentioned, bear numerals like the corresponding parts in Fig. 1, the fixed electrode 19 being provided to cooperate with the movable electrode 10$^a$ in producing the arc. If it be assumed that the electrode 10$^a$ is initially in contact with the fixed electrode 19, a maximum current will flow through the series field 12 and a minimum current will flow through the shunt field 15, thus producing a powerful resultant torque in the direction of the arrow 18, such as to raise the electrode 10$^a$ from the electrode 19, thereby striking the arc 11$^a$. A powerful torque for striking the arc is very desirable under some circumstances, as for example in arc welding where the electrode 10$^a$ (welding rod in this case) sometimes welds itself or "freezes" to the work (electrode 19), so that a powerful effort is necessary to separate it and reestablish the arc.

As soon as the arc is struck, the increased resistance at the lengthening gap between the parts 10$^a$ and 19 cuts down the flux through field 12 and correspondingly increases the flux in the shunt field 15. The movement of the electrode 10$^a$ thus quickly slows down until for any given potential in the controlled or arc circuit, a point of balance is soon reached at which the shaft 1 momentarily becomes stationary. As the electrode is constantly burned away, the arc gap lengthens, causing increased resistance in the series circuit through the field 12, so that the flux in the latter field gradually falls off. The flux in field 15 now becomes the more powerful, thus producing predominant torque in the direction of the arrow 17. The electrode 10$^a$ is now fed downwardly toward the electrode 19 until conditions of balance are again established. A substantially constant arc gap is thus automatically maintained so long as current at constant potential is supplied to the arc circuit.

Figure 3:
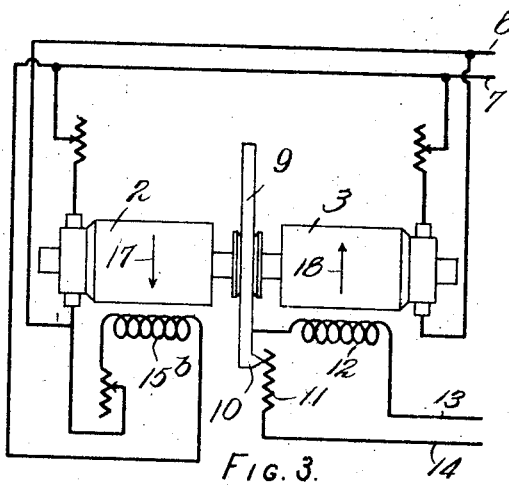
Fig. 3 is a diagrammatic view showing the field windings for one motor connected in series with the controlled circuit, and the field windings for the other motor connected to a source of substantially constant potential, the movable element constituting the adjustable contact of a rheostat.

In Fig. 3 I have illustrated a modified arrangement wherein, although the parts correspond generally to the similarly numbered parts in Fig. 1, I have connected the field 15$^b$ to receive current at substantially constant potential from the supply mains 6 and 7. Thus the field 15$^b$ is substantially constant and the torque in the direction of the arrow 17 varies very little. In this arrangement the variable resistance, including the parts 10 and 11, may be so designed that under normal conditions in the controlled circuit the torque in the direction of the arrow 18 just balances that in the direction of the arrow 17, and the shaft 1 and the movable contact 10 remain stationary. If, now, the conditions in the controlled circuit vary either above or below normal, the flux in field 12 will correspondingly vary and the shaft 1 will turn in response to the unbalanced torque, so as to restore normal conditions in the controlled circuit.

Figure 4:
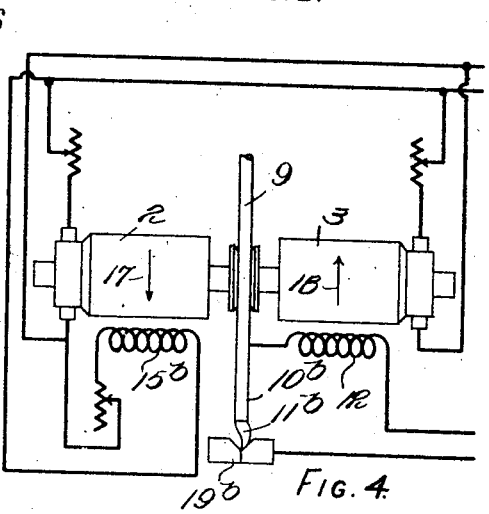
Fig. 4 is a view similar to Fig. 3 but showing the movable element as an arc electrode.

In Fig. 4 the parts all correspond to those in Fig. 3 with the exception of the substitution of a movable arc electrode 10$^b$ for the contact 10, the substitution of the arc 11$^b$ for the resistance 11, and the provision of a fixed electrode 19$^b$. In this arrangement the constant torque exerted by field 15$^b$ is opposed by the variable torque of field 12, the intensity of the flux through field 12 depending upon the length of the arc gap at any given time.

Figure 5:
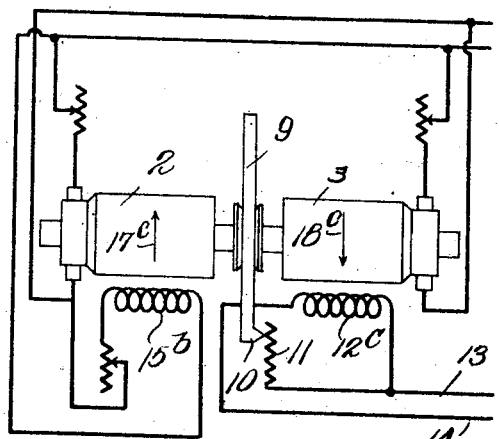
Fig. 5 is a diagrammatic view in which the field windings for one motor are in parallel with the controlled circuit, and the field windings for the other motor are connected to a source of substantially constant potential, the movable element being a rheostat contact.

In Fig. 5 I have shown a further modification wherein the parts are arranged similarly to correspondingly numbered parts in Fig. 3, except that the field windings 12$^c$ are connected in parallel with the controlled circuit. The armature and field windings are so designed as to exert torque in the direction of the arrows 17$^c$ and 18$^c$. The parts are normally so adjusted that the shunt current through field 12$^c$ exerts just sufficient torque to balance the torque exerted by field 15$^b$, but if the resistance between the parts 10 and 11 should increase, the shunt current through the field windings 12$^c$ becomes relatively stronger and causes contact 10 to move down, thus decreasing resistance of the controlled circuit to restore normal conditions.

Figure 6:
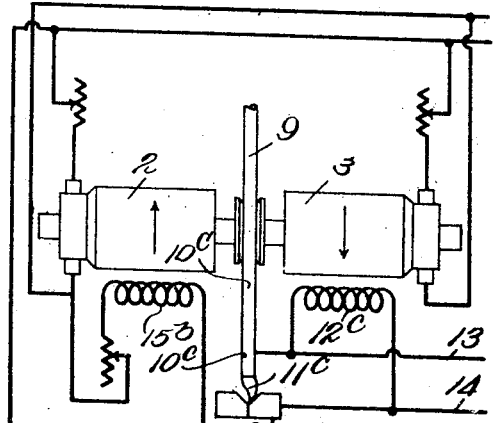
Fig. 6 is a diagrammatic view similar to Fig. 5 but showing the movable element as an arc electrode.

In Fig. 6 the parts are disposed as in Fig. 5, except for the substitution of the movable arc electrode 10$^c$ and the arc 11$^c$ for the parts 10 and 11, and the provision of the fixed electrode 19$^c$. In this device, change in potential in the arc circuit resulting from variation in resistance at the arc gap produces a corresponding variation in flux in the field 12$^c$ which results in movement of the armature shaft such as to restore normal potential conditions.

In Figs. 7 to 12 inclusive I have shown modifications of the arrangements shown in Figs. 1 to 6 respectively, wherein I have substituted for the separate armatures 2 and 3, a single armature 23, having a single commutator 45. The single armature in these modified constructions has windings designed to cooperate with the two fields 15 and 12 respectively to provide oppositely acting torques as indicated at 17 and 18, in the same way as in the devices shown in Figs. 1 to 6. In these modified arrangements shown in Figs. 7 to 12 the shaft 1 carries the friction pulley 8 or equivalent drive means near one end, rather than at its center, said drive means actuating the reciprocable "movable element" 9 which in Figs. 7, 9 and 11, carries the movable contact 10 of a variable resistance 11; in Figs. 8 and 12 carries the movable electrode $10^x$ cooperating with a fixed electrode $19^x$ to form the welding arc $11^x$; and in Fig. 10 carries the upper carbon C of a lamp having the cooperating carbon C'. In all other respects the devices shown in Figs. 7 to 12 are identical with those of Figs. 1 to 6 respectively, and function in the same manner so that further detailed description thereof is unnecessary.

I have herein shown various modifications of my invention by way of example, but without intending thereby to limit the scope of the invention, and wish it to be understood that I regard all equivalent devices as within the scope of the invention defined by the appended claims.

Among such equivalent devices I may refer specifically to an arrangement which appears most obvious, constituting a reversal of the arrangements illustrated, that is to say, one in which armature windings instead of field windings of the motor are connected to the controlled circuit. For example, such an arrangement may have the armature and field windings of one motor excited by a constant source of current and the field coils of the other motor excited from the same or a similar constant source, while the armature coil or windings of the latter motor are connected in series or in parallel with the controlled circuit. Likewise the field and armature windings of one motor may be excited from a constant source, while both field and armature coils of the other motor may be connected to the controlled circuit in any appropriate manner. It is to be understood that when hereinabove, as well as in the appended claims, I have made reference to the production of a field of force, without other qualifications, or have referred broadly to the use of a coil or windings for generating magnetic force, I intend thereby to indicate such force as may be generated by an armature coil as well as that which would be generated by field coils, since it is obvious that both field and armature coils have substantially the same function in producing lines of magnetic force.

I claim:
1. Apparatus of the class described comprising a rotatable shaft, an armature carried by the shaft, an electrical circuit including a movable resistance varying element, connections for transmitting movement from the shaft to the movable element, means supplying current to the armature at a substantially constant potential, means producing a magnetic field tending to turn the armature and shaft in one direction, means producing a second magnetic field tending to turn the armature and shaft in the opposite direction, and connections between said latter means and said movable element whereby the intensity of the second field varies with variations in current passing through said movable element.

2. Apparatus of the class described comprising a rotatable shaft, an armature fixed thereon, means supplying current to the armature, an electrical circuit including a movable element, the resistance in the circuit varying with the position of said element, means receiving current from a source independent of that supplying the armature for producing a field of electrical force tending to turn the armature shaft in one direction, means connected with said circuit for producing a second field of force tending to turn the shaft in the opposite direction, said second field varying in intensity with changes in potential in the circuit, and means for transmitting movement of the shaft synchronously to said movable element.

3. Apparatus of the class described comprising an electrical circuit having in series therein a movable element so arranged that movement of the element varies the current in the circuit, a rotary shaft, an armature thereon, field windings, means transmitting motion synchronously from the armature shaft to the movable element, independent means for supplying current to the armature and field windings, the latter being so arranged as to produce a magnetic field tending to turn the armature and shaft in one direction, other field windings disposed at another point longitudinally of the shaft from said first windings and arranged to produce an opposing magnetic field tending to turn the armature shaft in the opposite direction, and means connecting said latter field windings to said circuit in such manner that varying electrical conditions in the circuit produced by said movable element cause variations in the strength of said opposing field.

4. Apparatus of the class described comprising a rotatable shaft, an armature fixed thereto, means supplying current to the armature, a drive member carried by the shaft, a reciprocable element actuable by the drive member, an electrical circuit independent of the means supplying current to the armature and including a resistance changing part actuable by said reciprocable element, field coils producing a substantially constant field of force tending to turn the armature in one direction, other field coils so connected to said electrical circuit as to produce a second field of force tending to turn the armature in the opposite direction, and connections between the latter field coils and said resistance changing part whereby the intensity of said second field varies with the position of said resistance changing part.

5. Apparatus of the class described comprising a rotatable shaft, an armature fixed thereon, means energizing the armature at a substantially constant potential, an electrical circuit including a variable resistance device, means connecting the shaft and variable resitsance device whereby rotation of the shaft in one or the other direction causes corresponding movement of said variable resistance device, means independent of said electrical circuit for establishing a field of force tending to turn the armature and shaft in one direction, and means so connected to said circuit as to generate a field of force tending to turn the shaft in the opposite direction, the intensity of said latter field of force varying with variations in current in the circuit.

6. Apparatus of the class described comprising an electrical circuit including movable arc electrodes, a rotatable shaft, an armature carried by the shaft, means independent of said electrical circuit for supplying current to the armature, connections for transmitting movement synchronously from the shaft to one of the electrodes, means for producing a magnetic field tending to turn the armature and shaft in one direction, and means connected with said circuit for producing an opposing magnetic field whose strength varies with the relative positions of the electrodes while the same are at different potentials.

7. Apparatus of the class described comprising an electrical circuit including an arc electrode, a rotatable shaft, an armature fixed thereon, means for transmitting movement from the shaft to the arc electrode, means producing a field of force tending to turn the shaft in one direction, and field coils so connected to said circuit as to generate a field of force spaced longitudinally of the shaft from said first field and tending to turn the shaft in the opposite direction, said latter field varying in intensity with variations in current passing through the electrode.

8. Apparatus of the class described comprising a rotatable shaft, an armature fixed thereto, means for supplying current to the armature, a drive member carried by the shaft, a reciprocable element actuable by the drive member, an electrical circuit independent of the means supplying current to the armature, said circuit including relatively movable arc-electrodes, one of said electrodes being actuable by said drive member, means for producing a substantially constant field of force tending to turn the armature in a direction such as to cause the electrodes to approach, and means connected with said circuit for producing an opposing field of force exerting a torque on the shaft tending to move the electrodes apart, said latter torque varying in proportion to the current passing through said electrodes.

9. Apparatus of the class described comprising a rotatable shaft, an armature fixed thereon, means supplying current to the armature, an electrical circuit independent of the means supplying current to the armature, said circuit including a movable arc electrode and a fixed electrode cooperable with the movable electrode to form an arc in the circuit, means for transmitting movement from the shaft to the movable electrode, means producing a torque tending to turn the shaft in one direction, and field coils connected in said circuit for producing a field of force tending to turn the shaft in the opposite direction, said field of force varying in intensity with variations in current passing through said electrodes.

10. Apparatus of the class described comprising an electrical circuit including a part to be welded and a welding electrode movable toward and away from said part, a rotatable shaft, an armature carried by the shaft, connections for transmitting movement from the shaft to the electrode, means for producing a magnetic field tending to turn the armature and shaft in a direction such as to separate the electrode from the part to be welded, and means connected in said circuit for producing an opposing magnetic field at a point spaced from the first longitudinally of the shaft and whose strength increases relatively to the first field with the increase in the length of the arc produced by said electrode.

11. Apparatus of the class described comprising a rotatable shaft, an armature fixed thereto, means for supplying current to the armature, a drive member carried by the shaft, an electrical circuit independent of the means supplying current to the armature, said circuit including a fixed electrode and a movable electrode, the latter being actuable by the drive member, and means for producing substantially equal torques tending to turn the shaft in opposite directions, one of said latter means comprising a field coil so connected to said circuit as to produce a field of force reacting with the armature, said field being of maximum intensity when the current passing through said electrodes is greatest and becoming less intense as said current decreases.

12. Apparatus of the class described comprising a rotatable shaft, an armature fixed thereto, means supplying current to the armature, a drive member carried by the shaft, an electrical circuit independent of the means supplying current to the armature, said circuit including a fixed electrode and a movable electrode, the latter being actuable by the drive member, and means exerting substantially equal torques and tending to turn the shaft in opposite directions, one of said means comprising a field coil in series with said circuit and adapted to produce a field of force reacting with the armature.

13. Apparatus of the class described comprising a rotatable shaft, a pair of armatures fixed to the shaft at different points longitudinally of the latter, means supplying current to each of said armatures at a constant potential, means producing a field of force reacting with one armature and tending to turn the shaft in one direction, an electrical circuit independent of the means supplying current to each of said armatures, and means in series with said circuit for producing a field of force reacting with the second armature and tending to turn the shaft in the opposite direction, the circuit including a movable resistance part actuable by the shaft to vary the resistance in the circuit.

14. Apparatus of the class described comprising a rotatable shaft, a pair of armatures fixed to the shaft, means supplying current to each of said armatures at a constant potential, means producing a field of force reacting with one armature and tending to turn the shaft in one direction, an electrical circuit independent of the means supplying current to each of said armatures, and a field coil connected to said circuit and producing a field of force reacting with the second armature and tending to turn the shaft in the opposite direction, said circuit including a variable resistance device, and means actuable by the shaft for adjusting the position of said variable resistance device.

15. Apparatus of the class described comprising a rotatable shaft, a pair of armatures fixed to the shaft, means supplying current to each of said armatures at a constant potential, means including a field coil energized with current at substantially constant potential for producing a field of force reacting with one armature and tending to turn the shaft in one direction, an electrical circuit independent of the means supplying current to each of said armatures, a second field coil connected to said circuit and producing a field of force reacting with the second armature and tending to turn the shaft in the opposite direction, and means actuable by the shaft for varying the resistance in said circuit.

16. Apparatus of the class described comprising a rotatable shaft, a pair of armatures fixed to the shaft, means supplying current to said armatures at a constant potential, means including a field coil for producing a field of force reacting with one armature and tending to turn the shaft in one direction, an electrical circuit independent of the means supplying current to said armatures, a second field coil connected to said circuit and producing a field of force reacting with the second armature and tending to turn the shaft in the opposite direction, and means actuable by the shaft for varying the relative intensities of the fields produced by the two field coils.

17. Apparatus of the class described comprising a rotatable shaft, a pair of armatures fixed to the shaft, means supplying current to said armatures at a constant potential, means including a field coil for producing a field of force reacting with one armature and tending to turn the shaft in one direction, an electrical circuit independent of the means supplying current to said armatures, and a second field coil connected to said circuit and producing a field of force reacting with the second armature and tending to turn the shaft in the opposite direction, and means actuable by the shaft to vary the current flow in the second field coil.

18. Apparatus of the class described comprising a rotatable shaft, a pair of armatures fixed to the shaft, means supplying current to said armatures at a constant potential, means producing a field of force reacting with one armature and tending to turn the shaft in one direction, an electrical circuit independent of the means supplying current to the armatures, and a field coil connected to said circuit and producing a field of force reacting with the second armature and tending to turn the shaft in the opposite direction, said field coil being in series with said circuit, a movable resistance element in said circuit, and means transmitting motion from the shaft to said movable element.

19. Apparatus of the class described comprising a rotatable shaft, a pair of armatures fixed to the shaft, means supplying current to said armatures at a constant potential, means producing a field of force reacting with one armature and tending to turn the shaft in one direction, an electrical circuit independent of the means supplying current to the armatures, and a field coil connected to said circuit and producing a field of force reacting with the second armature and tending to turn the shaft in the opposite direction, said circuit comprising relatively movable arc electrodes, and means actuable by the shaft for varying the position of at least one of said electrodes.

20. Apparatus of the class described comprising a rotatable shaft, a pair of armatures fixed thereon, an electrical circuit comprising a fixed electrode and a movable electrode, means carried by the shaft for moving the movable electrode, means producing a field of force reacting with one armature and tending to turn the shaft in such a direction as to cause the electrodes to approach, and a field coil in series with the circuit and adapted to produce a field of force reacting with the other armature and tending to turn the shaft in the opposite direction.

21. Apparatus of the class described comprising a rotatable shaft, a pair of armatures fixed to the shaft, means supplying current to said armatures at a constant potential, means producing a field of force reacting with one armature and tending to turn the shaft in one direction, an electrical circuit independent of the means supplying current to the armatures, and a field coil connected to said circuit and producing a field of force reacting with the second armature and tending to turn the shaft in the opposite direction, said circuit comprising a fixed electrode and a movable electrode, means actuable by the shaft for varying the position of the movable electrode, the field of force reacting with the first armature being of substantially constant intensity and that produced by said field coil varying in intensity with the current passing through said electrodes.

22. Apparatus of the class described comprising a rotatable shaft, an electrical circuit including a movable resistance varying element, means actuable by the shaft for moving said element, and means tending to turn the shaft in opposite directions, said latter means comprising a coil so connected to said circuit as to generate magnetic force tending to turn the shaft, such magnetic force varying in intensity with the position of the movable element, and a second coil receiving electrical energy from a source independent of said circuit.

23. Apparatus of the class described comprising a rotatable shaft, a drive member carried by the shaft, an electrical circuit including a fixed electrode and a movable electrode, the latter being actuable by the drive member on the shaft, and means tending to turn the shaft in opposite directions, said means comprising two coils spaced longitudinally of the shaft, one at least of said coils being in series with said circuit.

24. Apparatus of the class described comprising a rotatable shaft, an armature fixed to the shaft, means supplying current to the armature, means reacting with the armature to produce a substantially constant torque tending to turn the shaft in one direction, an electrical circuit independent of the means supplying current to the armature, said circuit including a variable resistance element actuable by the shaft to vary the resistance in the circuit, and means including a coil connected to said circuit so as to exert a torque tending to turn the shaft in the opposite direction.

25. Apparatus of the class described comprising a rotatable shaft, an armature fixed to the shaft, means supplying current to the armature, means reacting with the armature to produce a torque tending to turn the shaft in one direction, an electrical circuit independent of the means supplying current to the armature, said circuit including a variable resistance device actuable by the shaft to vary the resistance in the circuit, and means for exerting a variable torque tending to turn the shaft in the other direction, said latter means comprising a coil in series with said circuit.

26. Apparatus of the class described comprising a rotatable shaft, electro-magnetic means tending to produce a substantially constant torque for turning the shaft in one direction, an electrical circuit independent of said electromagnetic means, said circuit including a variable resistance element actuable by the shaft to vary the resistance of the circuit, and means for exerting a torque tending to turn the shaft in the opposite direction, said latter means comprising a coil so connected to said circuit as to exert a torque whose intensity varies with the position of said movable resistance varying element.

27. Apparatus of the class described comprising a rotatable shaft, an armature fixed to the shaft, means supplying current to the armature, means reacting with the armature to produce a torque tending to turn the shaft in one direction, an electrical circuit independent of the means supplying current to the armature, said circuit including a fixed electrode and a movable electrode, the latter being movable by the shaft thereby to vary the arc gap between it and the fixed electrode, and means for exerting a torque tending to turn the shaft in the opposite direction, said latter means including a coil so connected to said circuit as to generate magnetic force whose intensity changes when the distance between the electrodes is varied.

28. Apparatus of the class described comprising a rotatable shaft, an armature fixed thereon, means supplying current to the armature at a substantially constant potential, an electrical circuit independent of the means supplying current to the armature, said circuit including a field coil producing a magnetic field reacting with the armature and tending to turn the shaft in one direction and a variable resistance device actuable by the shaft, said coil and variable resistance being so connected that the intensity of said field varies with the variations in current in said circuit caused by said variable resistance device, and means for producing a torque tending to turn the shaft in the opposite direction.

29. Apparatus of the class described comprising a rotatable shaft, an armature fixed thereon, means supplying current to the armature at a substantially constant potential, an electrical circuit independent of the means supplying current to the armature, said circuit including a field coil for producing a magnetic field reacting with the armature and tending to turn the shaft in one direction and a variable resistance device actuable by the shaft to vary the current passing through said field coil, and means for producing a torque tending to turn the shaft in the opposite direction.

30. Apparatus of the class described comprising a rotatable shaft, an armature fixed thereon, means supplying current to the armature at a substantially constant potential, an electric circuit independent of the means supplying current to the armature, said circuit including a field coil for producing a magnetic field reacting with the armature and tending to turn the shaft in one direction and a variable resistance device actuable by the shaft to vary the current passing through said field coil, and a second field coil producing an opposing magnetic field tending to turn the shaft in the opposite direction.

31. Apparatus of the class described comprising a rotatable shaft, an armature fixed thereon, means supplying current to the armature at a substantially constant potential, an electrical circuit independent of the means supplying current to the armature, said circuit including a field coil producing a magnetic field reacting with the armature and tending to turn the shaft in one direction, a fixed arc electrode and a movable arc electrode, the latter being actuated by the shaft, said coil and electrodes being so connected that the intensity of said field varies with variations in current in said circuit caused by the variations in the length of the arc, and means for producing a torque tending to turn the shaft in the opposite direction.

32. Apparatus of the class described comprising a rotatable shaft, an armature fixed thereon, means supplying current to the armature at a substantially constant potential, an electrical circuit independent of the means supplying current to the armature, said circuit including field coils producing opposing magnetic fields reacting with the armature and tending to turn the shaft in opposite directions, and a variable resistance device actuable by the shaft, one of said coils being connected in series with the variable resistance and the other in parallel therewith, whereby the relative intensities of said fields vary with variations in resistance of said device.

33. Arc welding apparatus comprising a rotatable shaft, an armature fixed thereon, means supplying current to the armature at a substantially constant potential, an electrical circuit independent of the means supplying current to the armature, said circuit including field coils producing opposing magnetic fields reacting with the armature and tending to turn the shaft in opposite directions, a fixed electrode, and a movable electrode actuable by the shaft, one of said coils being connected in series with the electrodes and the other in parallel therewith, whereby the relative intensities of said fields vary with variations in potential between said electrodes.

34. Apparatus of the class described comprising a rotatable shaft, an armature fixed thereon, means supplying current to the armature, an electrical circuit independent of the means supplying current to the armature, said circuit including a field coil producing a magnetic field reacting with the armature and tending to turn the shaft in one direction and a variable resistance device actuable by the shaft, said coil and resistance being connected in series, and means independent of said circuit producing a second magnetic field reacting with the armature and tending to turn the shaft in the opposite direction.

35. Arc welding apparataus comprising a rotatable shaft, an armature fixed thereon, means supplying current to the armature at a substantially constant potential, an electrical circuit independent of the means supplying current to the armature, said circuit incuding a field coil producing a magnetic field reacting with the armature and tending to turn the shaft in one direction, a fixed electrode, and a movable electrode actuable by the shaft, said coil and electrodes being connected in series, and means independent of said circuit producing a second magnetic field reacting with the armature and tending to turn the shaft in the opposite direction.

36. Apparatus of the class described comprising a rotatable shaft, an armature fixed thereon, means supplying current to the armature, an electrical circuit independent of the means supplying current to the armature, said circuit including a field coil producing a magnetic field reacting with the armature and tending to turn the shaft in one direction and a variable resistance device actuable by the shaft, said coil and resistance being connected in parallel, and means independent of said circuit producing a second magnetic field reacting with the armature and tending to turn the shaft in the opposite direction.

37. Arc welding apparatus comprising a rotatable shaft, an armature fixed thereon, means supplying current to the armature at a substantially constant potential, an electrical circuit independent of the means supplying current to the armature, said circuit including a field coil producing a magnetic field reacting with the armature and tending to turn the shaft in one direction, a fixed electrode, and a movable electrode actuable by the shaft, said coil and electrodes being connected in parallel, and means independent of said circuit producing a second magnetic field reacting with the armature and tending to turn the shaft in the opposite direction.

38. The herein-described method of control of an electrical circuit having therein a variable resistance element so connected to a rotatable shaft that rotation of the shaft varies the resistance of the circuit, which method comprises establishing a magnetic field exerting a torque tending to turn the shaft in one direction and whose intensity varies in response to variations in potential in the circuit caused by the variable resistance element, and establishing a second magnetic field of constant intensity exerting a torque tending to turn the shaft in the opposite direction.

39. The herein-described method of control of an electrical circuit having therein a variable resistance element so connected to a rotatable shaft that rotation of the shaft varies the resistance of the circuit, which method comprises establishing a magnetic field exerting a torque tending to turn the shaft in one direction and whose intensity varies in response to variations in resistance in the circuit caused by the variable resistance element, and establishing a second magnetic field of constant intensity exerting a torque tending to turn the shaft in the opposite direction.

40. The herein-described method of control of an electrical circuit having therein a potential-varying device actuable by a rotatable shaft, which method comprises establishing a magnetic field exerting a torque tending to turn the shaft in one direction, and whose intensity varies in response to variations in current in the circuit caused by the potential-varying device, and establishing a second magnetic field of constant intensity exerting a torque tending to turn the shaft in the opposite direction.

41. The herein-described method of control of an electrical circuit wherein the resistance varies in accordance with the variations in position of a movable element actuable by a rotatable shaft, which method comprises establishing a magnetic field exerting a torque tending to turn the shaft in one direction and whose intensity varies in accordance with variations in position of said movable element, and establishing a second magnetic field of constant intensity exerting a torque tending to turn the shaft in the opposite direction.

Signed by me at Boston, Massachusetts this 21st day of July 1928.

JAMES S. SMYSER.